UNITED STATES PATENT OFFICE.

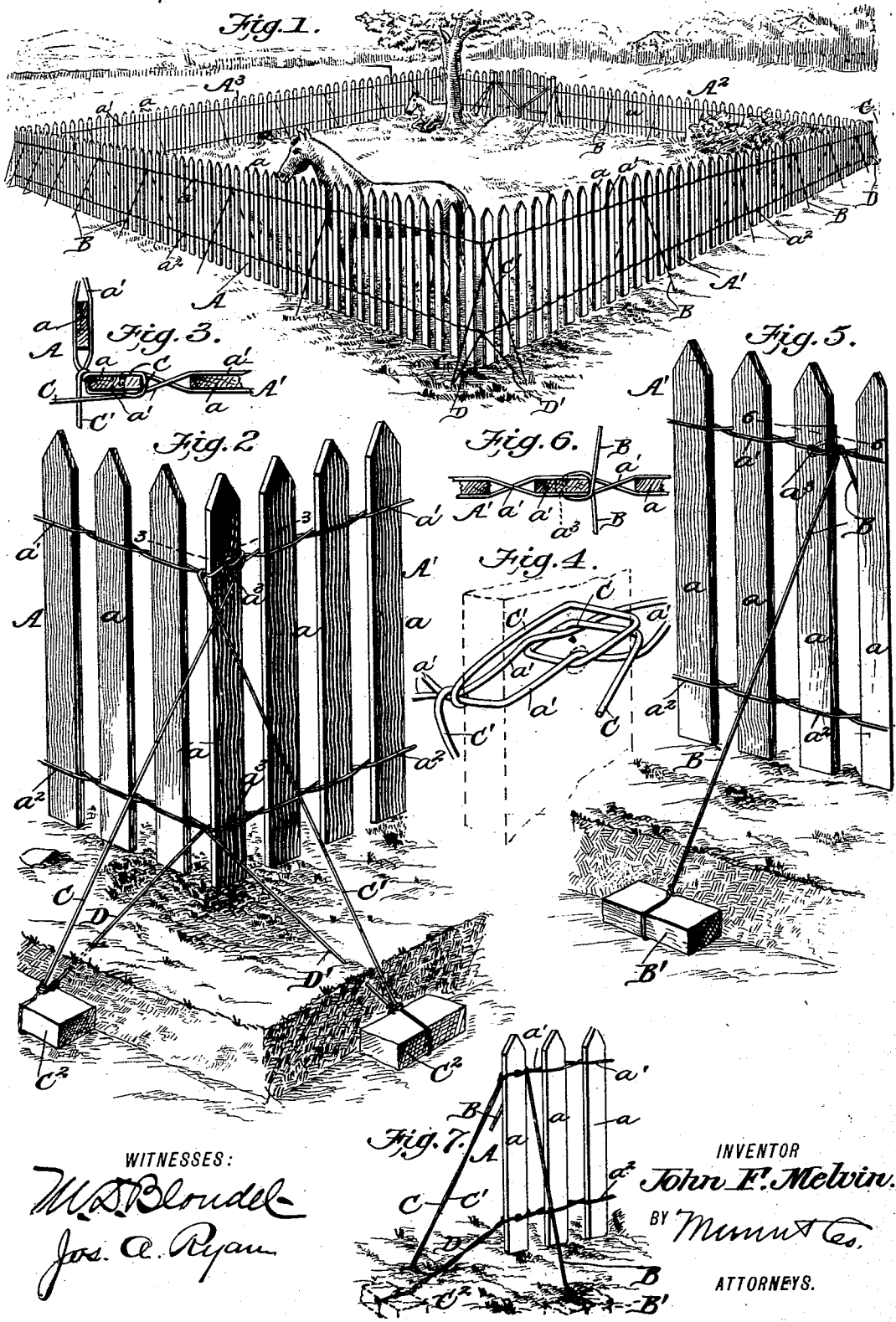

JOHN F. MELVIN, OF MAYFIELD, KENTUCKY.

FENCE.

SPECIFICATION forming part of Letters Patent No. 569,138, dated October 6, 1896.

Application filed June 10, 1896. Serial No. 594,901. (No model.)

*To all whom it may concern:*

Be it known that I, JOHN F. MELVIN, a citizen of the United States, residing at Mayfield, in the county of Graves and State of Kentucky, have invented certain new and useful Improvements in Fences, of which the following specification contains a full, clear, and exact description, reference being had to the accompanying drawings, forming part thereof, in which—

Figure 1 is a view of my improved postless fence as in use. Fig. 2 is a detail perspective view of one corner of the fence. Fig. 3 is a detail section on the line 3 3, Fig. 2. Fig. 4 is a detail view showing the position and manner of fastening the corner loop and brace wires, the picket being shown in dotted lines. Fig. 5 is a detail perspective view showing the manner of bracing the intermediate section of the fence. Fig. 6 is a detail section on the line 6 6, Fig. 5; and Fig. 7 is a detail perspective view of a modified form.

The object of my invention is to provide a picket fence in which all posts will be dispensed with.

The invention will first be described and then specifically pointed out in the claim.

A A' A² A³ represent the four lengths of my improved postless fence as it would appear when erected to form an oblong inclosure. Each length or section of the fence is formed of a series of vertical slats or pickets $a$, connected by the upper and lower wires $a'$ $a^2$, looped around the pickets and intertwined therebetween after the manner of the ordinary woven picket fence. The wires $a'$ $a^2$ of the several fence-sections are united at the corners of the fence or the corner-pickets are otherwise firmly secured together. At intervals throughout the length of the fence-sections a picket $a$ is provided at its upper end with an aperture $a^3$, and the end pickets are provided with similar apertures $a^3$ at their upper and lower ends. The fence-sections are braced intermediate of their ends by brace-wires B, which are passed through the apertures in the upper ends of the pickets, where the wires are twisted and then brought down to the opposite sides of the fence, where they are provided with anchors B', buried a suitable depth in the ground. These braces and anchors prevent sagging and hold the fence perfectly straight. At the corners of the fence or opposite ends of a length of fence the same is braced by brace-wires C C', extending downward and outward from the upper apertures $a^3$ to the anchors C², which are also buried in the ground. These wires are crossed between their ends and may be twisted together, if desired, at their point of crossing. Shorter brace-wires D D' extend from the lower ends of the corner-pickets to the anchors C². These brace-wires C C' D D' exert an outward strain on the fence-corners both at the upper and lower ends thereof, and after the fence has been stretched taut will hold it firmly in an upright position.

Where a straight length of fence only is to be erected, the end pickets will be braced by the brace-wires B and their anchors B', and the brace-wires C C' will then extend from the end pickets in the direction of the length of the fence, as shown in Fig. 7.

Having thus described my invention, what I claim as new, and desire to secure by Letters Patent, is—

In a postless fence, the combination with the pickets and their intertwisted upper and lower wires $a'$ $a^2$, forming the sections of the fence; of bracing-wires C C' for said sections at their ends extending through apertures in the top of the end picket, the wire C being passed around the back of said picket, thence forwardly and downwardly, and the wire C' being extended around the front of said picket, thence downwardly and outwardly, crossing said former wire, the lower ends of said wires being connected directly with anchors buried in the ground, wires D D' connecting the lower end of said end picket directly with said anchors, and additional bracing-wires B connecting the tops of certain pickets between the ends of the fence-section with anchors buried in the ground as and for the purpose set forth.

JOHN F. MELVIN.

Witnesses:
JOHN D. E. BOAZ,
J. K. REYNOLDS.